United States Patent [19]
Caden et al.

[11] Patent Number: 5,484,622
[45] Date of Patent: Jan. 16, 1996

[54] LOW FAT FOOD PRODUCT

[76] Inventors: Jeffrey A. Caden, 10045 Secretariat La., NE., Bainbridge Island, Wash. 98110; Mark Wolke, 245 Wildwood Dr., Isaquah, Wash. 98027

[21] Appl. No.: 404,506

[22] Filed: Mar. 15, 1995

Related U.S. Application Data

[63] Continuation of Ser. No. 105,395, Aug. 12, 1993, Pat. No. 5,422,132.
[51] Int. Cl.$^6$ .................................................. A21D 10/00
[52] U.S. Cl. ........................ 426/555; 426/549; 426/804
[58] Field of Search .................................. 426/549, 615, 426/804, 578, 518, 640, 653, 555

[56] References Cited

U.S. PATENT DOCUMENTS

| | | | |
|---|---|---|---|
| 4,405,647 | 9/1983 | Fisher et al. | 426/4 |
| 5,104,669 | 4/1992 | Wolke et al. | 426/94 |
| 5,260,087 | 11/1993 | Stad | 426/615 |
| 5,422,132 | 6/1995 | Caden et al. | 426/555 |

OTHER PUBLICATIONS

The Greenfield Healthy Foods Company, Inc.; The Brownie, Fat Free Low Sodium, Greenfield Healthy Foods Brownie, 1992, 2 pages.

The PlumLife Company, Inc.; 'Just Like Shortenin' The Better Baking Alternative, undated, 2 pages.

California Prune Board Research Report, Utilization of Dried Plums in Reduced–Fat/Cholesterol–Free Bakery Products, dated Jan., 1992, 7 pages.

Sunsweet Growers Inc.; Sunsweet Prune Paste/Powder Low Fat Recipes, undated, 9 pages.

*Primary Examiner*—Jeanette Hunter
*Attorney, Agent, or Firm*—McAndrews, Held & Malloy, Ltd.

[57] ABSTRACT

All natural, low-fat baked foods (such as cookies, cakes, and brownies) and methods of making and baking them utilize a mixture of flour, high amylose starch, and prune as a flour, fat, and egg yolk substitute. They may also include high amylopectin starch. They are, in addition low in sodium and include no mono- or diglycerides.

9 Claims, No Drawings

LOW FAT FOOD PRODUCT

This is a continuation of application Ser. No. 08/105,395 filed Aug. 12, 1993, U.S. Pat. No. 5,422,132

BACKGROUND OF THE INVENTION

A. Field of the Invention

The present invention relates to a low-fat food product. More particularly, the present invention preferably relates to a baking flour and fat substitute that is low not only in triglycerides but also in mono- and diglycerides as well.

Preferably, the resulting flour-based food product is also all natural, cholesterol free, low in sodium, resistant to mold formation, and yet very easy and economical to manufacture, ship, and sell. An additional aspect is that the food product can be resistant to microwave-induced loss of palatability (texture and taste).

B. State of the Art

Conventional formulations of baked goods have long employed animal fat (such as lard and butter), vegetable fat, and egg yolks to provide certain important properties during mixing and baking and, afterwards, in the resulting baked food product. Animal fat, for example, typically renders flour dough much more creamy, flowable, and viscous. This makes the dough much less sticky and much easier to handle, particularly in high volume, commercial mixing machinery. The fat in the dough also helps reduce sticking of the baked product to a baking pan or other baking surface during the cooking step.

Fat is used in relatively high concentrations in pie crust to provide a crispy and quite flaky texture in the crust. Fat is used in lower concentrations in cookies and brownies to disperse and retain water in the body of a cookie or brownie while providing a crisp but not flaky outer crust. In addition, fat, which is an emulsifying agent, can provide moisture stabilizing and retaining effects that can significantly enhance shelf life of baked goods.

The use of animal fats in food products and baking, however, raises numerous problems the food industry has long sought to solve. The human body stores the fat as fat. Stored fat is relatively difficult for the body to process and is generally burned after all ready sources of carbohydrates are exhausted. As a result, fat adds to body weight and can exacerbate or cause many health problems.

Animal fat and egg yolks are also high in cholesterol. Cholesterol is widely known to contribute to a variety of health problems, such as high blood pressure and clogging of the arteries.

The food industry long ago discovered that substitution of vegetable oil or fat (such as corn syrup) for animal fat reduces cholesterol content, while enhancing resistance to rancidity of the resulting baked good. Vegetable oil nevertheless still is a triglyceride fat and processed as a fat by the human body. It also can have a significantly deleterious effect on the taste of the resulting baked good.

It is for this reason that vegetable fat is typically used in combination with other fat substitutes such as egg whites, mono- and diglycerides, and starches. All these substitutes can significantly affect the taste of the resulting product, requiring significant effort to reformulate a given baked good to minimize change of taste from the traditional recipe for the baked good.

In addition, mono- and diglycerides, although not presently classified as fats by the FDA, are nevertheless digested, stored, and processed by the human body in virtually the same fashion as ordinary triglyceride fats. Thus, it appears that mono- and diglycerides cause many of the same weight management and health problems brought about by consumption of the triglyceride through animal and vegetable fats and egg yolk.

There have been several attempts to incorporate dried or wet prunes, dates, and other sources of extracted pectin in order to obtain "low fat" baked goods. Examples of these types of solutions are reflected in: (i) "Just Like Shortenin'" by The Plumlife Co. of Madison, Conn.; (ii) the "Sunsweet Prune Paste/Powder Low Fat Recipes" of the Sunsweet Growers, Inc., Yuba City, Calif.; (iii) the report on "Utilization of Dried Plums in Reduced-Fat/Cholestrol-Free Bakery Products" by the California Prune Board, Pleasanton, Calif.; and (iv) the "Brownie, Fat Free. Low Sodium," by Greenfield Healthy Foods Co , Southport, Conn.

The pectin globules in these products (prunes, dates, and pectin extract) are known to function somewhat like, although by no means identically to, fat globules. In this regard, pectin does not have the same moisture stabilization and retention properties as fat or mono- or diglycerides. Also, by themselves, these sources of pectin can yield a chewy, grainy, and bitter (Ph adjusted) result.

For example, some of these techniques have utilized a variety of fat-like additives such as mono- or diglycerides (disclosed as "emulsifiers" in the Sunsweet Growers recipes and the California Prune Board report cited above). They have thus obtained foods that have been advertised as "low fat" under FDA rules but in reality include significant fat-like baking additives with their attendant complications and disadvantages for the consumer.

Other attempts at a solution using prunes, dates, or extracted pectins have required other additives, such as sorbitol, maltic acids, eggs, or soy lecithin. (See, e.g., the Plumlife Company and Greenfield Healthy Food Company products, and the California Prune Board report cited above.) These types of formulations affect taste, texture, and baking characteristics. They have involved substantial experimentation and reformulation of traditional recipes, have not provided 1:1 substitutes for flour, and frequently are not all-natural and do not yield acceptable taste, texture, or shelf life. (Id.; see also the Sunsweet Growers recipes cited above.)

In addition, many of these prior attempts at providing low-fat baked goods have nonetheless utilized fat on the cooking surface during the cooking step. (See the California Prune Board report and the Sunsweet Growers recipes.) One reason these methods utilize fat is because of "increased stickiness of the dough due to lack of shortening," i.e. fat in the dough itself. (See California Prune Board report at last page.) As noted in the California Prune Board report (last page), use of fat in this manner results in absorption of at least some fat in the resulting food product. Without such use of fat during baking of such formulations, the dough may stick to the cooking surface and require extra effort to remove it. (Id.)

Another problem is that traditional baked goods made with animal fats, vegetable fat, egg yolk, or mono- or diglycerides have not microwaved well. As explained in applicant Wolke's prior U.S. Pat. No. 5,104,669, entitled "Microwaveable Flour-Starched Based Food Product," issued Apr. 14, 1992 (the "669 Patent," which the applicants incorporate herein by reference), microwaving of such traditional mixtures frequently renders them unpalatable, with hardened, rubbery, or gummy crusts, and soggy, unevenly baked insides.

The invention of the '669 Patent solved the problem of microwave deterioration to a very significant degree. The '669 invention provides a flour-starch mixture suitable for use as a flour substitute in baked goods. The '669 Patent's flour substitute is called a "flour-starch" mixture consisting of about 85% to 35% flour, 15% to 60% high amylose starch, and 25% to 5% high amylopectin starch. The '669 Patent and its invention did not, however, eliminate the use of fats, fat-like substitutes such as mono- or diglycerides, or egg yolk.

OBJECTS OF THE INVENTION

It is therefore an object of the present invention to provide an improved low-fat food product.

It is another object of the present invention to provide a flour-based food product that is not only extremely low in fat but also very low in cholesterol and, preferably, low in sodium as well.

Yet another object is to provide a low-fat, flour-based food product that does not include any mono- or diglycerides as emulsifier substitutes for cooking or baking fat.

A further object is to provide a low-fat flour substitute for flour-based baked goods that is easy and economical to make, package, ship, and use.

A still further object is to provide a low-fat flour-based product in which the flour substitute is all natural. An additional object is to provide a low-fat, low-cholesterol, flour-based baked good made from readily available components.

Another object of this invention is to provide a low-fat flour-based food product that has good shelf life and is resistant to mold formation.

Also, one object of this invention is to provide a low-fat, flour-based food that may cooked in a microwave oven and is resistant to microwave-induced loss of palatability.

Yet another object is to provide a low-fat, low-cholesterol flour and fat substitute and resulting food product that requires little or no reformulation of traditional food recipes other than deletion of baking fats, egg yolks, and mono- or diglycerides and substitution of a flour-substitute mix for flour into the recipe.

An additional object is to provide a low-fat, low cholesterol flour and fat substitute and resulting food product that is relatively easy and economical to make, package, store, ship, and sell.

Yet another object is to provide a low-fat, flour-based food product that can be cooked without use of fat and yet without excessive sticking of the product to a cooking surface.

There are other objects and advantages apparent from the detailed description below.

SUMMARY OF THE INVENTION

The foregoing and other objects and advantages are achieved by our invention of a starch-prune mixture of the type useable in a flour-based food product. Preferably, the mixture includes flour as well as high amylose starch and prune for inclusion as a flour and baking fat substitute in a food product. Most preferably, the flour-starch-prune mixture is substituted part for part in an otherwise traditional flour-based baked food recipe, with the exception of the additional deletion of any baking fats, egg yolk, or mono- or diglycerides from the recipe.

DETAILED DESCRIPTION OF THE PREFERRED EMBODIMENTS

The present invention has several preferred embodiments. They are described in the following discussion with all references to percentages being to the percentage dry weight of the final mixture.

In this regard, all flour and starches have some moisture content. For simplicity in the following description, however, the moisture in the flour, starch, and prune is not considered and the percentage of the flour, starch, and prune is expressed in terms of dry weight. For example, a flour-starch-prune mixture having, by weight, 10% moisture, 45% flour, 22.5% prune, and 22.5% high amylose starch is expressed in the following description as being composed of 50% flour, 25% prune, and 25% high amylose starch.

In this specification, the term "about" generally means less than plus or minus 1% unless the context states otherwise.

Also, the term "flour" means any flour, either alone or in a mixture. The term means, for example, wheat, rye, corn, rice, or other flour appropriate for flour-based food products, such as cookies, cakes, and brownies.

The applicants believe that most starches include about 25% amylose. The term "high amylose starch" as used in this specification means a single starch or a mixture of starches in which at least about 40% by weight of the starch content is amylose.

In commercially available single high amylose starches, the applicants believe that the non-amylose remainder of the single starch is amylopectin. The ratio of amylose to amylopectin in such high amylose starches is thus believed to be at least 2:3.

A suitable high amylose starch is commercially available under the name "Crisp Film" from National Starch, of Chicago, Ill. The applicants understand that "Crisp Film" is a modified high amylose corn starch that is a white to off-white powder, having a pH of 6.0, a moisture content of approximately 11%, an average crystal size of about 25–35 microns, and in terms of starch is comprised of about 50% amylose and 50% amylopectin.

Another commercially available high amylose starch is Crisp Tex. Crisp Tex is made by American Maize Products, Inc., Hammond, Ind.

As used in this specification, the term "high amylopectin starch" means a single starch or a mixture of starches in which the amylopectin is greater than about 80% of the weight of the starch. Suitable high amylopectin starches include the "waxy" starches, such as waxy corn starch, waxy maize starch, and the modified waxy corn or maize starches. A preferred high amylopectin starch is the modified waxy maize starch that is commercially available under the tradename "Colflo 67" from National Starch, Chicago, Ill. "Colflo 67" is a white to off-white powder having a pH of approximately 6, a moisture content of about 11%, an average crystal size of about 25–35 microns, and in terms of starch is comprised of about 90–100% amylopectin.

The term "dried prune" in this specification means dried prune granules or flakes. In the following examples, the applicants utilized "Dried Prune Flakes" from Quest International of Medford, Oreg. Applicants believe that these flakes include relatively small amounts of tapioca as a carrier and lubricant for aid in manufacturing the flakes. Applicants believe that pure dried prune, prune paste, prune puree, and other types of prunes can also work effectively in the present invention.

The applicants' first preferred embodiment is directed to a flour-starch-prune mixture made by combining in any order 76 parts by weight (76%) flour, 12 parts by weight (12%) high amylose starch, and 12 parts by weight (12%) dried prune (hereinafter referred to as "the preferred flour-starch-prune mixture"). This resulting flour-starch-prune mixture is an intermediate composition used to prepare the flour-based food product of the present invention.

The following are examples of use of the first preferred flour-starch-prune mixture as a 1:1 substitute for flour in the following recipes. The recipes are otherwise traditional with the exception that, unless otherwise noted, they do not include any fat or mono- or diglycerides. All temperatures are reported in degrees Fahrenheit.

EXAMPLE 1

Oatmeal Raisin & Apple Chip Cookie Employing The Present Invention

Soak 1 cup of raisins and apple chips in water for 10 minutes. Toast 1¼ cups of oatmeal in a 350° oven on a cookie sheet. Drain the raisins and set aside.

Mixture #1
- 1¼ cup of the preferred flour-starch-prune mixture;
- ½ teaspoon of baking soda;
- ½ teaspoon of salt; and
- ½ teaspoon of cinnamon; and ¼ teaspoon of nutmeg.

Mix the above ingredients thoroughly and set aside.

MIXTURE #2:
- 2 tablespoons & ¾ cup of fructose;
- 2 tablespoons of vanilla;
- ¼ cup of brown sugar; and
- 3 tablespoons of water.

Mix the above ingredients thoroughly.

Add Mixture #1 to Mixture #2 and mix thoroughly. Fold in the raisins, apple chips, and oatmeal. Deposit one ounce cookies onto a Teflon-lined cookie pan, and slightly flatten the cookies. Bake them for 14 minutes at 350°. The recipe yields two dozen one ounce cookies.

EXAMPLE 2

Chocolate Chip Cookies Employing the Present Invention

MIXTURE #1:
- 2½ cups of the preferred flour-starch-prune mixture;
- 1 teaspoon of baking soda; and
- 1 teaspoon of salt.

Blend the above together well and set aside.

MIXTURE #2:
- ¾ cup of fructose;
- ¾ cup of brown sugar;
- 1 teaspoon of vanilla; and
- 7 tablespoons of water.

Mix the above together well.

Mix Mixture #1 with Mixture #2, and blend well. Add 1 cup of chocolate chips and 1 cup of chopped walnuts. Deposit one ounce cookies onto a Teflon-lined cookie pan, and slightly flatten the cookies. Bake them for 14 minutes at 350°. The recipe yields two to two and one-half dozen one ounce cookies.

EXAMPLE 3

Big Chipper Employing the Present Invention MIXTURE #1:
- 2½ cups of the preferred flour-starch-prune mixture;
- 1¼ teaspoons of baking soda;
- 1 teaspoon of salt; and
- 3 tablespoons of baking cocoa.

Blend together well and set aside.

MIXTURE #2:
- 1 cup of fructose;
- ¾ cup of brown sugar;
- 1 teaspoon of vanilla; and
- 7 tablespoons of water.

Blend together well.

Mix Mixture #1 with Mixture #2, and blend well. Add 1½ cups of white chocolate chips and 1 cup of chopped macadamia nuts. Then mix well. Deposit one ounce cookies onto a Teflon cookie pan, and slightly flatten the cookies. Bake at 350° for 14 minutes, yielding two to two and one-half dozen one ounce cookies.

EXAMPLE 4

Poppy Seed Cupcakes Employing the Present Invention

MIXTURE #1:
- 3 tablespoons of water; and
- 1 can poppy seed filling.

Mix and set aside.

MIXTURE #2:
- 1 teaspoon vanilla;
- 1½ cups non-fat milk; and
- 1½ tablespoons of lemon juice.

Mix together and set aside.

MIXTURE #3:
- 2¾ cups of the preferred flour-starch-prune mixture;
- 1 teaspoon of baking soda;
- 1 cup of fructose; and
- 1 teaspoon of salt.

Blend together.

Combine Mixtures 1, 2, and 3, and mix well. Beat four egg whites in a separate bowl until fluffy, then fold egg whites into the mixture. Place in cupcake cups, and then bake at 350' for 25 minutes. The recipe yields 18 2.5 ounce cupcakes.

EXAMPLE 5

Brownies Utilizing the Present Invention

MIXTURE #1:
Sift together:
- 1½ cups of the preferred flour-starch-prune mixture;
- ⅓ cup of cocoa;
- ¾ cup of fructose;
- ½ teaspoon of baking soda;
- ¼ teaspoon of baking powder;
- ½ teaspoon of salt; and
- 2 tablespoons of water.

Mix together and set aside.

MIXTURE #2:

½ cup of water;

2 teaspoons of vanilla; and

½ cup of fructose.

Mix together, and then add Mixture #1 to Mixture #2. Blend the mix until smooth. Fold in 1 cup of semi-sweet chocolate pieces and ¾ cup of chopped walnuts. Pour into a 13"×9"/pan Teflon or non-stick. Bake at 350° for 24 minutes.

EXAMPLE 6

Bran-Raisin Muffins Including the Present Invention

Combine and set aside 1½ tablespoons of lemon juice and 1 ½ cup of non-fat milk. Soak 2 cups of raisins in water.
MIXTURE #1:

2 cups of bran;

¾ teaspoon of baking soda; and

¾ teaspoon of baking powder.

Mix together, and pour in the non-fat milk and lemon juice. Mix together well and set aside.
MIXTURE #2:

1 cup of brown sugar;

3 egg whites;

1½ teaspoon of vanilla;

1½ tablespoons of molasses; and 1 tablespoon of fructose.

Mix well and set aside.
MIXTURE #3:

Sift together:

1½ cup of the preferred flour-starch-prune mixture;

1½ teaspoon of cinnamon; and

½ teaspoon of salt.

Mix thoroughly, and then mix together with Mixtures 1 and 2 at high speed until smooth. Fold in 2 cups of raisins. Deposit in muffin liners on a muffin tray and bake at 350° for 25 minutes. Makes 12 2" muffins.

In each of the above examples, the resulting cookies, cupcakes, muffins, and brownies had several unexpected properties: excellent baking and handling characteristics (enough body without being too runny or sticky); appearance, moistness, texture, chewiness, and mouth feel indistinguishable from the traditional recipes; and shelf life at least as long as, and sometimes days longer than, that provided by the traditional recipes. Most unexpected of all was that the above properties were obtained in cookies, cupcakes, muffins, and brownies that were substantially all natural and yet 99–100% free of cooking or baking fats or mono- and diglycerides.

The preferred flour-starch-prune mixture used in the examples above was made on-site immediately prior to use. Alternatively, the flour-starch-prune mixture may be premixed and shipped to other locations for use on making food products. Since it is preferably a dry mixture, the cost of shipping the preferred flour-starch-prune mixture is much less than the cost of shipping prior art wet prune or similar components for use in baking.

Another alternative is to pre-make a starch-prune mixture, ie., "a premix." The premix can then be shipped to a user who can incorporate traditional flour as necessary to accomplish the desired result. This alternative would reduce shipping costs even further and allow the user greater options and control over the use the premix and its relative ratios to other components added by the user. To date, the inventors have utilized a dry prune flake from Quest Intl in their development activities which contains tapioca starch as a processing aid. It is their understanding that in the past, Quest has also utilized Col-Flo 67 (high amylo pectin starch) as a processing aid. The inventors presume that through processing the prune flake with high amylopectin in the correct ratios, in lieu of tapioca starch, a premix will be obtained that both process easily and exhibit the orgnoleptiv low fat properties discussed above.

In this regard, the relative quantities of the flour, starch, and prune components can vary and still provide an effective substitute mixture for the conventional flour component in the examples described above. The applicants have found that the substitute flour-starch-prune mixture can comprise (i) from about 1% to about 38% dried prune, (ii) from about 1% to about 14% high amylose starch, and (iii) the balance flour, i.e., from about 98% to about 48% flour. In other words, the applicants prepare a flour-starch-prune mixture by combining in any order about 1 to about 38 parts by weight dried prune, from about 1 to about 14 parts by weight high amylose starch, and from about 98 to 49 parts by weight flour.

In the starch-prune premix described above, the flour is deleted; the prune component is about 1 to about 38 parts by weight dried prune; and the starch component is about 1 to about 14 parts by weight high amylose starch. In percentage of premix terms, the premix comprises from about 7% (1/15 total parts) to about 97% (38/39 total parts) dried prune and from about 93% (14/15 total parts) to about 3% (1/39 total parts) high amylose starch. Similar starch-prune premix calculations and range conversions can be derived for the various alternative flour-starch-prune ranges described below.

With the high amylose starch in the 1% to 14% range, the resulting example products mixed and baked well. The lower amounts of high amylose starch resulted in more chewyness. The best overall results occurred with the high amylose starch comprising about 9% to about 13% of the flour-starch-prune mixture. In this latter, preferred range, the product not only mixed and baked well but also maintained good moistness, good mouth feel and texture, and an excellent shelf life of 14 days. Finally, in blind taste testing the above examples made with the high amylose starch in this latter, preferred range could not be distinguished from their respective traditional recipe products made with traditional fat and egg yolk components.

With the dried prune in the 1% to 38% range, the products in the lowest range work well as a fat mimic. However, products tend to harden quickly. In the highest range, they involved well but tend to take on the taste and mouthfeel of prune, exhibiting gooey texture. The cookies tended to have optimal fat mimic properties with the dried prune in the range of about 3% to about 10%; and the other cake-like products (the cupcakes, muffins, and brownies) had optimal fat mimic properties with the dried prune in the range of about 11% to about 35%. Dried prune in the range of about 5% to about 15% worked acceptably well in a mixture useable for all of the examples. These products were oranoleptically most comparable to conventional "fat bakery products" with good shelf life properties.

In the embodiments described above the high amylose starch includes both amylose and amylopectin. Applicants believe that the amylopectin somewhat mimics the properties of fat, and the amylose has film forming properties that yield the desired crispness in the resulting product. Applicants believe that this combination allows the present invention to function effectively with a reduced amount of prune, which serves as a fat substitute but also, as the quantity of prune increases, can negatively affect the taste and texture of the resulting food product.

Another aspect of the present invention is the flour-starch-prune mixture described above further including a high amylopectin starch. In the above examples, addition of the high amylopectin starch in the range of about 0.45% to 6.3% within the flour-starch-prune mixture in the examples above yields food products with the advantages described above including both extended shelf life and enhanced microwaveability. (See U.S. Pat. No. 5,104,669 referenced in the Background section above.) In fact, the examples above were cooked satisfactorily by microwaving rather than baking, resulting in good tasting cookies, muffins, cupcakes, and brownies. At the lower end of the range, the shelf life is greatly reduced. Products cook most satisfactorily at the high end of the range, however, beyond 6.3% the product does not resemble the oranoleptic characteristics of traditional baked goods (ie: waxy, starch texture & taste).

In this regard, the applicants' preferred embodiment of the flour-starch-prune mixture including high amylopectin is comprised of about 73% flour, 13% modified high amylose starch, 12% dried prune, and 2% high amylopectin starch, As noted in U.S. Pat. No. 5,104,669, however, the same effect may be achieved by a single starch yielding the same effective ratio of amylose starch to amylopectin starch, In the applicants most preferred embodiment (13% high amylose starch, 2% high amylopectin starch), that ratio is about 0.56:1. In the applicants' preferred range (1% to 14% high amylose, 0.45% to 6.3% high amylopectin), the ratio of amylose to amylopectin is from 0.45 to 1.0. In the applicants' most preferred range (9% to 13% high amylose, 0.45% to 6.3% high amylopectin) that ratio is 0.45:1.0.

In the foregoing, the applicants have described their preferred embodiments. The scope of the invention, however, is determined by reference to the following claims.

The applicants claim:

1. A starch-prune premix for use in making a flour-based food product, the premix comprising in combination:
   A. amylopectin starch
   B. amylose starch; and
   C. prune; the starches and prune being mixed together to form the premix whereby a user may add flour and other components in order to make the flour-based food product.

2. The starch-prune mix of claim 1 wherein the amylopectin starch and amylose starch together comprise about 45% to about 55% of the premix and the prune comprises about 45% to about 55% of the premix.

3. The starch-prune premix of claim 1 wherein the prune is dried prune.

4. A starch-prune premix for use in making a flour-based food product, the premix comprising in combination:
   A. a high amylose starch; and
   B. prune; The high amylose starch and prune being mixed together to form the premix whereby a user may add flour and other components in order to make the flour-based product.

5. The starch-prune premix of claim 4 wherein the prune is dried prune.

6. A flour-starch-prune mixture comprising in admixture:
   A. about 49% to about 98% flour;
   B. an amylopectin starch;
   C. an amylose starch, the starches together comprising about 1% at about 14% of the mixture; and
   D. about 1% to about 38% prune.

7. The flour-starch-prune mixture of claim 6 wherein the ratio of amylose to amylopectin is about 0.56:1.

8. A flour-starch-prune mixture comprising:
   A. about 49% to about 98% flour;
   B. about 1% to about 14% high amylose starch; and
   C. about 1% to about 38% prune.

9. The flour-starch-prune mixture of claim 8 wherein the prune is dried prune.

* * * * *